United States Patent Office 2,932,666
Patented Apr. 12, 1960

2,932,666

FATTY ACID AMIDE DERIVATIVES

Meier E. Freed, Philadelphia, Pa., assignor to American Home Products Corporation, New York, N.Y., a corporation of Delaware No Drawing. Application August 7, 1958
Serial No. 753,653

2 Claims. (Cl. 260—559)

This invention relates to fatty acid amide derivatives and more particularly to a di-fatty acid amide and salts thereof.

Poly-fatty acid amides are known to the art, as evidenced by various patents. These amides are stated to be useful in the textile industry as softeners or dispersing agents probably because the compounds contain long-chain aliphatic radicals and therefore impart to these amides interface modifying action. In these disclosures no mention is made, nor has it ever been ascertained, that these compounds possess pharmacological activity.

Later discoveries have shown that some classes of di-fatty acid amides do demonstrate therapeutic activity. Thus, Martin et al., in Patent No. 2,411,662, disclose the preparation of a large number of amides all stated to have an "analeptic" action. On the other hand, a patent has recently been issued to Seifter et al., 2,780,646, disclosing a group of di-fatty acid amides having potent local anesthetic action.

It is pointed out in the aforesaid Seifter et al. patent, and it has been corroborated, that there is little prediction with respect to the pharmacological activity noted. Thus, as this patent points out, an amide having an alcoholic radical of 2 to 4 carbons shows effective anesthetic action but a substantially similar amide having a hexanol radical does not have this utility.

The present invention deals with the discovery of a cyclohexanol di-fatty acid amide showing potent local anesthetic action. The compound, dl-trans-2-N,N-di[N-methyl-N-(omega-phenyl-tert. butyl)-acetamido]amino-cyclohexan-1-ol, having the formula

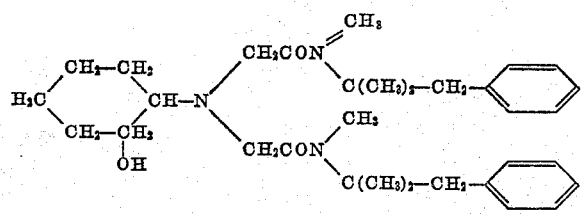

and acid-addition salts thereof have been found to possess strong local anesthetic action and thus is deemed to have utility as a special anesthetic in either veterinary or human medicine.

The free base may be prepared by reacting dl-trans-2-amino-cyclohexan-1-ol with N-methyl-N-chloro-acetyl-omega-phenyl-tert.butylamine, at a molar ratio of approximately 1:2. The solvent medium may be butanol and the reaction is carried out in the presence of an acid-binding agent such as alkali-metal carbonate or bicarbonate. The reaction proceeds at reflux temperature.

The following example illustrates the procedure in greater detail.

7.5 grams (0.05 mole) of dl-trans-2-amino-cyclohexan-1-ol hydrochloride was dissolved in 250 cc. n-butanol. 30 grams sodium carbonate was added and suspended by stirring. 24 grams (0.1 mole) N-methyl-N-chloroacetyl-omega-phenyl-t-butyl amine was added and the mixture refluxed 18 hours. After cooling the reaction mixture was filtered, the filtrate treated with dry hydrogen chloride and refiltered. The filtrate was concentrated to syrup under vacuum and crystallized from ether-hexane mixture. Product was filtered off, washed with acetone and dried. Yield: 9.5 grams, M. Pt.: 126° C. Free base (from hexane) M. Pt. 108–108.5° C.

Analysis.—Fnd. 74.0 C; 9.01 H; 8.06 N. Calc. 73.75 C; 9.06 H; 8.05 N.

The acid-addition salts of the base may be prepared in any known manner, either by reacting the free base with the desired acid in a suitable solvent, or by a metathetic reaction utilizing a salt of the base with a salt of the desired acid in a solvent medium. Any acid, organic or inorganic, may be used which forms a salt that is non-toxic at the dosage level deemed desirable. Thus, such acids as hydrochloric, sulfuric, phosphoric, acetic, tartaric, citric, etc., make useful salts.

This application is a continuation-in-part of application Serial No. 696,621 filed November 15, 1957, now abandoned.

I claim:

1. A compound of the group consisting of a di-fatty acid amide and the non-toxic, pharmacologically acceptable, acid addition salts thereof, said amide having the formula

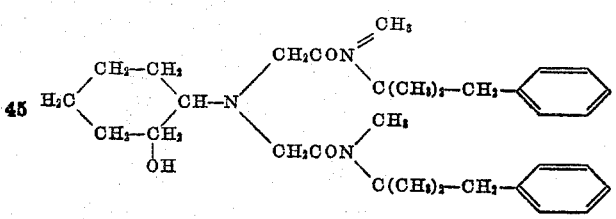

2. As a new compound, 2-N,N-di-[N-methyl-N-(omega-phenyl-tert.butyl)-acetamido]-cyclohexan-1-ol amine.

References Cited in the file of this patent
UNITED STATES PATENTS 2,411,662    Martin et al.  ------------- Nov. 26, 1946
2,780,646    Seifter et al.  ------------- Feb. 5, 1957

UNITED STATES PATENT OFFICE
Certificate of Correction

Patent No. 2,932,666

Meier E. Freed

April 12, 1960

It is hereby certified that error appears in the printed specification of the above numbered patent requiring correction and that the said Letters Patent should read as corrected below.

Column 1, lines 46 to 53, and column 2, lines 41 to 48, claim 1, the first two-thirds of the graphic formula, each occurrence, should appear as shown below instead of as in the patent:

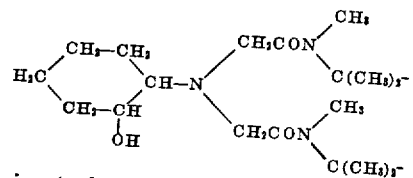

same column 2, line 39, claim 1, for "acid addition" read —acid-addition—.

Signed and sealed this 25th day of October 1960.

[SEAL]

Attest:
KARL H. AXLINE,
*Attesting Officer.*

ROBERT C. WATSON,
*Commissioner of Patents.*